(12) United States Patent
Wagh et al.

(10) Patent No.: US 7,674,333 B2
(45) Date of Patent: Mar. 9, 2010

(54) LIGHT WEIGHT PHOSPHATE CEMENTS

(75) Inventors: Arun S. Wagh, Naperville, IL (US);
Ramkumar Natarajan, Woodridge, IL (US); David Kahn, Miami, FL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 11/454,724

(22) Filed: Jun. 16, 2006

(65) Prior Publication Data

US 2007/0051278 A1    Mar. 8, 2007

Related U.S. Application Data

(60) Provisional application No. 60/714,101, filed on Sep. 2, 2005.

(51) Int. Cl.
*C04B 28/10*  (2006.01)
*C04B 9/00*  (2006.01)

(52) U.S. Cl. .................. 106/801; 106/685; 106/690; 106/691; 106/705

(58) Field of Classification Search .............. 106/691, 106/801, 685, 690, 705
See application file for complete search history.

(56) References Cited

U.S. PATENT DOCUMENTS

| 4,174,227 | A | * | 11/1979 | Tomic |
|---|---|---|---|---|
| 4,756,762 | A | * | 7/1988 | Weill et al. |
| 4,786,328 | A | * | 11/1988 | Weill et al. |
| 5,382,289 | A | * | 1/1995 | Bambauer et al. ........... 106/690 |
| 6,136,088 | A | * | 10/2000 | Farrington .................. 106/691 |
| 6,143,069 | A |   | 11/2000 | Brothers et al. |
| 6,561,269 | B1 |  | 5/2003 | Brown et al. |
| 6,910,537 | B2 |  | 6/2005 | Brown et al. |
| 7,160,383 | B2 | * | 1/2007 | Wagh et al. ................ 106/691 |
| 2002/0165082 | A1 |  | 11/2002 | Singh et al. |
| 2003/0131759 | A1 | * | 7/2003 | Francis et al. |
| 2005/0252419 | A1 | * | 11/2005 | Mabey ....................... 106/638 |

OTHER PUBLICATIONS

Answer 146 of 234 of CA of STN RO 90016 (Paniti) Aug. 30, 1986 abstract only.*
CN 1044840 (Aug. 22, 1990) Weng et al. abstract only.*

* cited by examiner

*Primary Examiner*—Paul Marcantoni
(74) *Attorney, Agent, or Firm*—Olson & Cepuritis, Ltd.

(57) ABSTRACT

A sealant having a specific gravity in the range of from about 0.7 to about 1.6 for heavy oil and/or coal bed methane fields is disclosed. The sealant has a binder including an oxide or hydroxide of Al or of Fe and a phosphoric acid solution. The binder may have MgO or an oxide of Fe and/or an acid phosphate. The binder is present from about 20 to about 50% by weight of the sealant with a lightweight additive present in the range of from about 1 to about 10% by weight of said sealant, a filler, and water sufficient to provide chemically bound water present in the range of from about 9 to about 36% by weight of the sealant when set. A porous ceramic is also disclosed.

11 Claims, No Drawings

LIGHT WEIGHT PHOSPHATE CEMENTS

RELATED APPLICATIONS

This application claims the benefit under Title 35, United States Code §119(e) of U.S. Provisional Application Ser. No. 60/714,101 filed Sep. 2, 2005.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates to a phosphate cement or sealant formulations suitable for shallow and heavy oil and coal bed methane (CBM) fields.

BACKGROUND OF THE INVENTION

In particular, the invention relates to a formulation that has a specific gravity between about 0.7 and about 1.6 is rich in silica fume or an acceptable substitute and hence contains high proportions of water as well as fly ash, and entrains air and thus provides higher yields compared the conventional cements.

Oil recovery from heavy oil and CBM fields requires sealants or cements that are tolerant to steam, carbon dioxide, and also hydrogen sulfide. Portland cement based formulations do not perform well in such environments. Phosphate cements, being tolerant to steam and other named gases, are more likely to be successful. The formulations disclosed earlier, such as in U.S. Pat. Nos. 6,561,269 and 6,910,537, the entire disclosures of which are incorporated by reference, however, need to be suitably modified to increase the yield and lower the cost, be tolerant to steam injection, so that they can effectively compete with the cements used at present in such fields. This invention includes such formulations.

The sealants or cements for heavy oil and CBM fields must satisfy the following requirements:

1. The cements should be ultralight to match the density of the formation. Heavier cements tend to fracture the formation resulting in water intrusion during setting of the cements.
2. The cements should be tolerant to steam injection and stable in hydrocarbon and sulfide and sulfate environments.
3. The cost of these cements should be low.

SUMMARY OF THE INVENTION

The principal object of this invention is to provide a sealant or cement for use in heavy oil and CBM fields that have light densities close to the densities of field formations and are tolerant to steam injection and stable in hydrocarbon sulfide and sulfate environments.

Another object of the invention is to provide porous and lightweight ceramics for a variety of purposes.

Still another object of the invention is to provide a sealant having a specific gravity in the range of from about 0.7 to about 1.6 for heavy oil and/or coal bed methane fields, the sealant comprising a binder including an oxide or hydroxide of Al or of Fe present in the range of from about 2 to about 25% by weight and a phosphoric acid solution present in the range of from about 10 to about 40% by weight or including MgO or an oxide of Fe present in the range of from about 2 to about 25% by weight and/or an acid phosphate present in the range of from about 10 to about 40% by weight, the binder being present in the range of from about 20 to about 50% by weight of the sealant, a lightweight additive present in the range of from about 1 to about 10% by weight of the sealant, a filler, and water sufficient to provide chemically bound water present in the range of from about 9 to about 36% by weight of the sealant when set.

A further object of the invention is to provide a sealant having a specific gravity in the range of from about 0.7 to about 1.6 for heavy oil and/or coal bed methane fields, the sealant comprising a binder including MgO or an oxide of Fe present in the range of from about 2 to about 25% by weight and $KH_2PO_4$ present in the range of from about 10 to about 40% by weight, the binder being present in the range of from about 20 to about 50% by weight of the sealant, a lightweight additive including silica fume present in the range of from about 1 to about 10% by weight of the sealant, a filler, and chemically bound water present in the range of from about 9 to about 36% by weight of the sealant.

A still further object of the invention is to provide a porous phosphate ceramic having a specific gravity in the range of from about 0.7 to about 1.6, comprising the reaction products of an oxide or hydroxide of Al or of Fe present in the range of from about 2 to about 25% by weight and a phosphoric acid solution present in the range of from about 10 to about 40% by weight or MgO and/or an oxide of Fe present in the range of from about 2 to about 25% by weight and/or a potassium acid phosphate present in the range of from about 10 to about 40% by weight, the reaction products being present in the range of from about 20 to about 50% by weight of the ceramic, a lightweight additive present in the range of from about 1 to about 10% by weight of the ceramic, and a filler.

The invention consists of certain novel features and a combination of parts hereinafter fully described, and particularly pointed out in the appended claims, it being understood that various changes in the details may be made without departing from the spirit, or sacrificing any of the advantages of the present invention.

DETAILED DESCRIPTION OF THE INVENTION

By introducing fumed silica in the compositions reported in provisional application Ser. No. 60/607,123 filed Sep. 3, 2004, and a non-provisional application filed Aug. 24, 2005, application Ser. No. 11/212,087, the entire disclosure of which is incorporated herein, the following advantages are obtained.

1. Fumed silica absorbs significant amount of water. This increases water content in the cement and produces lighter weight cement.

Typically, by adding 4 wt. % silica fume, we have been able to increase the water content in the cement by 50% and reduce the density of calcium silicate containing cement by 10%. In another test, Chemergy Corporation from Canada obtained cement with a low specific gravity of 1.2 by introducing silica fume and ash. The strength of these cements has remained in the order of 2,500 psi, which is adequate for oil well cements.

A composition that produces a set cement of specific gravity of one is formed by introducing 50 wt. % binder, 4 wt. % silica fume, 16 wt. % Ceramicrete binder, and 30 wt. % water. This is not only light but also is very economical, because it uses only a modest amount of the binder and silica fume. Ceramicrete binder includes an oxide or hydroxide of Al or Fe present in the range of from about 2 to about 25% by weight and a phosphoric acid solution in the range of from about 10 to about 40% by weight including MgO or an oxide of Fe present in the range of from about 2 to about 25% by weight and/or an acid phosphate present in the range of from about 10 to about 40% by weight of the binder. The binder may be present in the range of from about 20% by weight of the sealant.

2. Light weight compositions may also be produced by injecting air, inert gases, carbon dioxide, and foaming agents. Preferred light weight additives are one or more of silica fume, perlite, glass and/or ceramic beads, polymer or glass microspheres, vermiculite, bentonite, saw dust, rubber crumb, a gas producing and/or foaming agent and natural and/or zeolite. Other gas producing or foaming agents useful are one or more of an alkali or alkaline earth carbonate, a surfactant or hydrogen peroxide.

3. Light weight compositions for high temperature can also be produced by using aluminum phosphate cement reported in the incorporated application. In the preferred embodiment of this invention, silica fume is introduced along with aluminum oxide and hydroxides and reacted with phosphoric acid solution. Fe may be substituted for Al in the binder if desired.

The cements formed are light and stable when steam is injected in the wells. These formulations are stable in downhole hydrocarbon environments.

Once developed, these lightweight cements may also be useful in many other applications. Two specific applications are the following.

1. Cements as Neutron Moderators

Water is used as a moderator of fast neutrons. Water, however being a liquid, is prone to dispersion and sabotage, and hence during the storage of spent nuclear fuel or in waste packages for disposal, it is necessary to use a cement or ceramic form that is an efficient neutron moderator. The moderated neutrons can then be absorbed by boron isotopes $^{11}B$. In an earlier invention, Publication No. US 2002/0165082 published Nov. 7, 2002, U.S. Ser. No. 09/791,422 filed Feb. 23, 2001, the disclosure of which is incorporated herein by reference, a phosphate cement based formulation, containing boron carbide was disclosed. The lightweight cement formulation of this invention is an improvement of this earlier invention. The newly invented material, because of more water in it, will moderate the neutrons that will be subsequently absorbed by the boron isotopes.

2. Porous Phosphate Based Refractories

Phosphate refractories must be porous so that they become good insulators. It is difficult to produce intricate shapes of such refractories by the current powder packing and firing method. Phosphate cements set at room temperature and can be produced in any intricate form. When they are fired, the high content of water will escape and produce uniformly porous refractories of desired shape. The light weight cements of this invention allow production of such refractories at a much lower cost due to reduced rejection rate during the production.

The invented lightweight porous sealants were used in four tests to demonstrate their effectiveness in sealing heavy oil and CBM fields, satisfying the three criteria set forth above.

In each case the objective was to produce phosphate cement with low density and yet having a compressive strength at least 500 psi. Spherelite and pearlite, both commercially available low cost materials were also added.

| | | | Low Density Formulations | | |
|---|---|---|---|---|---|
| Test no. | Wt % Binder (MgO + MKP) | Wt % Fly Ash | Wt % Light Wt. (additive) | Density (grams/cc) | Comp. Strength (psi) |
| 1 | 40 | 40 | 20 (Spherelite) | 1.43 (12 ppg) | 1003 after 22 hrs at 76 F. |
| 2 | 42.1 | 37.6 | 19.8 (Spherelite) | 1.43 (12 ppg) | 1224 after 48 hrs at 160 F. |
| 3 | 41.7 | 49.5 | 8.5 (Perlite) | 1.14 (9.5 ppg) | 330 after 24 hrs at 76 F. |
| 4 | 45.5 | 45.5 | 9 (Perlite) | 1.56 (13 ppg) | 1075 after 24 hrs at 76 F. |

PPG—Pounds per gallon,
Ratio of MgO:MKP = 1:3 in all tests.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A sealant having a specific gravity in the range of from about 0.7 to about 1.6 for heavy oil and/or coal bed methane fields, said sealant comprising
   a) about 20 to about 50% by weight of a binder comprising about 2 to about 25% by weight of MgO or an oxide of Fe and further comprising about 10 to about 40% by weight $KH_2PO_4$,
   b) about 1 to about 10% by weight of silica fume,
   c) 37.6 to 49.5 percent by weight of one or more filler selected from the group consisting of fly ash and calcium silicate, and
   d) chemically bound water present in the range of from about 9 to about 36% by weight of said sealant.

2. The sealant of claim 1, wherein the ratio of MgO to $KH_2PO_4$ or an oxide of Fe to $KH_2PO_4$ is in the range of from about 3:1 to about 1:3.

3. The sealant of claim 1, wherein said sealant is porous with a porosity in the range of from about 20 to about 75%.

4. The sealant of claim 1, wherein said silica fume is present at a concentration of about 4% by weight of said sealant.

5. The sealant of claim 1, wherein said filler is fly ash.

6. The sealant of claim 5, wherein said sealant is porous with a porosity in the range of from about 20 to about 75%.

7. A sealant having a specific gravity in the range of about 0.7 to about 1.6 suitable for use in heavy oil and/or coal bed methane fields, said sealant consisting of:
   a) about 20 to about 50% by weight of a binder including about 10 to about 40% by weight $KH_2PO_4$ and about 2 to about 25% by weight of MgO or an oxide of Fe;
   b) about 1 to about 10% by weight of silica fume;
   c) 37.6 to 49.5 percent by weight of fly ash; and
   d) chemically bound water present in the range of from about 9 to about 36% by weight of said sealant.

8. The sealant of claim 7, wherein the ratio of MgO to $KH_2PO_4$ or an oxide of Fe to $KH_2PO_4$ is in the range of from about 3:1 to about 1:3.

9. The sealant of claim 7, wherein said sealant is porous with a porosity in the range of from about 20 to about 75%.

10. The sealant of claim 7, wherein said silica fume is present at a concentration of about 4% by weight of said sealant.

11. The sealant of claim 10, wherein said sealant is porous with a porosity in the range of from about 20 to about 75%.

\* \* \* \* \*